(12) United States Patent
Hu et al.

(10) Patent No.: US 11,409,153 B2
(45) Date of Patent: Aug. 9, 2022

(54) 3D DEVICE AND MANUFACTURING METHOD THEREOF

(71) Applicants: BEIJING BOE DISPLAY TECHNOLOGY CO., LTD., Beijing (CN); BOE TECHNOLOGY GROUP CO., LTD., Beijing (CN)

(72) Inventors: Weipin Hu, Beijing (CN); Yun Qiu, Beijing (CN); Xiao Sun, Beijing (CN); Hebin Zhao, Beijing (CN); Yanfeng Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 977 days.

(21) Appl. No.: 16/080,336

(22) PCT Filed: Feb. 28, 2018

(86) PCT No.: PCT/CN2018/077547
§ 371 (c)(1),
(2) Date: Aug. 28, 2018

(87) PCT Pub. No.: WO2019/019634
PCT Pub. Date: Jan. 31, 2019

(65) Prior Publication Data
US 2021/0199985 A1 Jul. 1, 2021

(30) Foreign Application Priority Data
Jul. 27, 2017 (CN) .......................... 201710623150.1

(51) Int. Cl.
*G02F 1/1335* (2006.01)
*G02B 30/30* (2020.01)

(52) U.S. Cl.
CPC ....... *G02F 1/133512* (2013.01); *G02B 30/30* (2020.01); *G02F 1/133514* (2013.01)

(58) Field of Classification Search
CPC ........ G02B 30/30; G02B 30/26; G02B 30/33; G02F 1/133514; G02F 1/133512
(Continued)

(56) References Cited

U.S. PATENT DOCUMENTS

2015/0109666 A1 4/2015 Wei et al.

FOREIGN PATENT DOCUMENTS

CN 101162311 4/2008
CN 101393344 A 3/2009
(Continued)

OTHER PUBLICATIONS

CN104460016 translation obtained on ProQuest on Aug. 23, 2021.*
(Continued)

*Primary Examiner* — Kristina M Deherrera
(74) *Attorney, Agent, or Firm* — Calfee, Halter & Griswold LLP

(57) ABSTRACT

The embodiments of the present disclosure provide a 3D display device and a manufacturing method thereof. The 3D display device includes a first substrate; a second substrate disposed opposite to the first substrate; a black matrix; and a grating. The black matrix and the grating are disposed on a side of the first substrate facing away from the second substrate; the black matrix and the grating are disposed in a same layer; and a side of the first substrate where the black matrix and the grating are located is a light exit side of the 3D display device.

14 Claims, 3 Drawing Sheets

(58) Field of Classification Search
USPC .......................................................... 359/462
See application file for complete search history.

(56) References Cited

FOREIGN PATENT DOCUMENTS

| | | |
|---|---|---|
| CN | 102289016 | 12/2011 |
| CN | 103454807 A | 12/2013 |
| CN | 104460016 A | 3/2015 |
| JP | 2001125088 A | 5/2001 |
| WO | 2014063411 | 5/2014 |

OTHER PUBLICATIONS

WO2014/063411 translation obtained from WIPO on Aug. 23, 2021.*
Hecht, Eugene. "The Diffraction Grating." Optics-Fourth Edition. Pearson, 2002, p. 476.*
Search Report and Written Opinion for International Application No. PCT/CN2018/077547 dated May 16, 2018, in the file on Aug. 28, 2018 not Feb. 25, 2019.
Search Report from European Application No. 18755693.1 dated Mar. 24, 2021.

* cited by examiner

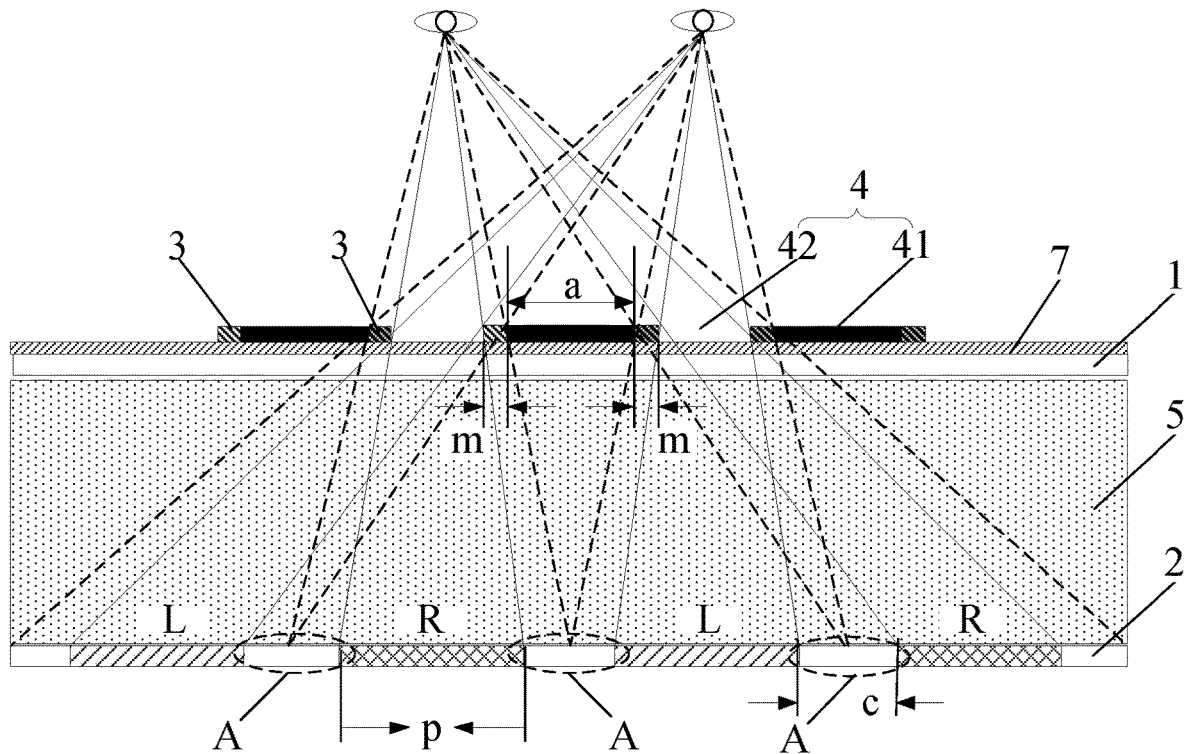

Fig. 2D providing a first substrate and a second substrate opposite to the first substrate — S1 forming a black matrix and a grating on a side of the first substrate facing away from the second substrate; the black matrix and the grating are disposed in a same layer; and a side of the first substrate where the black matrix and the grating are located is a light exit side of the 3D display device — S2

Fig. 3

3D DEVICE AND MANUFACTURING METHOD THEREOF

RELATED APPLICATIONS

The present application is the U.S. national phase entry of the international application PCT/CN2018/077547, with an international filing date of Feb. 28, 2018, which claims the benefit of Chinese Patent Application No. 201710623150.1, filed on Jul. 27, 2017, the entire disclosures of which are incorporated herein by reference.

TECHNICAL FIELD

The present disclosure relates to the field of display technology, and particularly to a 3D display device and a manufacturing method thereof.

BACKGROUND

In a conventional 3D display device, 3D display is realized by using a grating and a display panel, thereby providing a desired visual experience.

SUMMARY

According to an embodiment of the present disclosure, a 3D display device is provided. The 3D display device includes: a first substrate; a second substrate disposed opposite to the first substrate; a black matrix; and a grating. The black matrix and the grating are disposed on a side of the first substrate facing away from the second substrate; the black matrix and the grating are disposed in a same layer; and a side of the first substrate where the black matrix and the grating are located is a light exit side of the 3D display device.

Optionally, in some embodiments, the second substrate is an array substrate, a color filter is disposed on the second substrate, and a side of the first substrate facing the second substrate is not provided with a black matrix.

Optionally, in some embodiments, the grating includes a plurality of shielding portions disposed in parallel with each other, and two side edges of each shielding portion are respectively in contact with the black matrix.

Optionally, in some embodiments, the second substrate includes a plurality of sub-pixels, and a crosstalk region between adjacent sub-pixels.

Optionally, in some embodiments, the black matrix, the shielding portion, the sub-pixel, and the crosstalk region satisfy the following relationship:

$$m = c \times k/2;$$

$$a + 2m = (p+c) \times k;$$

m is a line width of the black matrix, c is a line width of the crosstalk region, k is a shrinkage ratio, a is a line width of the shielding portion, and p is a line width of the sub-pixel.

Optionally, in some embodiments, the line width of the black matrix is about 4.996 μm, the line width of the crosstalk region is about 5 μm, the shrinkage ratio is about 0.9993, the line width of the shielding portion is about 49.964 μm, and the line width of the sub-pixel is about 50 μm.

Optionally, in some embodiments, a material of the grating is same to a material of the black matrix.

Optionally, in some embodiments, the grating and the black matrix are formed integrally.

Optionally, in some embodiments, the black matrix and the grating are formed on a surface of the first substrate facing away from the second substrate.

Optionally, in some embodiments, the 3D display device further includes: a third substrate attached to the surface of the first substrate facing away from the second substrate; the black matrix and the grating are formed on a surface of the third substrate facing away from the second substrate.

Optionally, in some embodiments, the 3D display device further includes: a film substrate attached to the surface of the first substrate facing away from the second substrate; the black matrix and the grating are formed on a surface of the film substrate facing away from the second substrate.

According to another embodiment of the present disclosure, a method for manufacturing the 3D display device according to the above mentioned embodiments is provided. The method includes: providing a first substrate and a second substrate opposite to the first substrate; and forming a black matrix and a grating on a side of the first substrate facing away from the second substrate. The black matrix and the grating are disposed in a same layer; and a side of the first substrate where the black matrix and the grating are located is a light exit side of the 3D display device.

Optionally, in some embodiments, the step of forming a black matrix and a grating on a side of the first substrate facing away from the second substrate includes: forming the black matrix and the grating on a surface of the first substrate facing away from the second substrate by a patterning process.

Optionally, in some embodiments, the step of forming a black matrix and a grating on a side of the first substrate facing away from the second substrate includes: forming the black matrix and the grating on a surface of a third substrate by a patterning process; and attaching the third substrate to the first substrate. The black matrix and the grating are located on a surface of the third substrate facing away from the second substrate.

Optionally, in some embodiments, the step of forming a black matrix and a grating on a side of the first substrate facing away from the second substrate includes: forming the black matrix and the grating on a surface of a film substrate by a patterning process; and attaching the film substrate to the first substrate. The black matrix and the grating are located on a surface of the film substrate facing away from the second substrate.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

FIG. 2D is a schematic diagram of an optical path of a 3D display device according to yet another embodiment of the present disclosure; and FIG. 3 is a flowchart of a method for manufacturing a 3D display device according to an embodiment of the present disclosure.

DETAILED DESCRIPTION OF THE DISCLOSURE

In the following, the technical solutions in embodiments of the disclosure will be described clearly and completely in connection with the drawings in the embodiments of the disclosure. Obviously, the described embodiments are only part of the embodiments of the disclosure, and not all of the embodiments. Based on the embodiments in the disclosure, all other embodiments obtained by those of ordinary skills in the art under the premise of not paying out creative work pertain to the protection scope of the disclosure.

In view of the deficiencies in the prior art, a 3D display device and a method for manufacturing the same are provided, which at least partially solve the problem that the display effect and the production capacity of the existing 3D display device cannot be balanced.

Figure 2A:
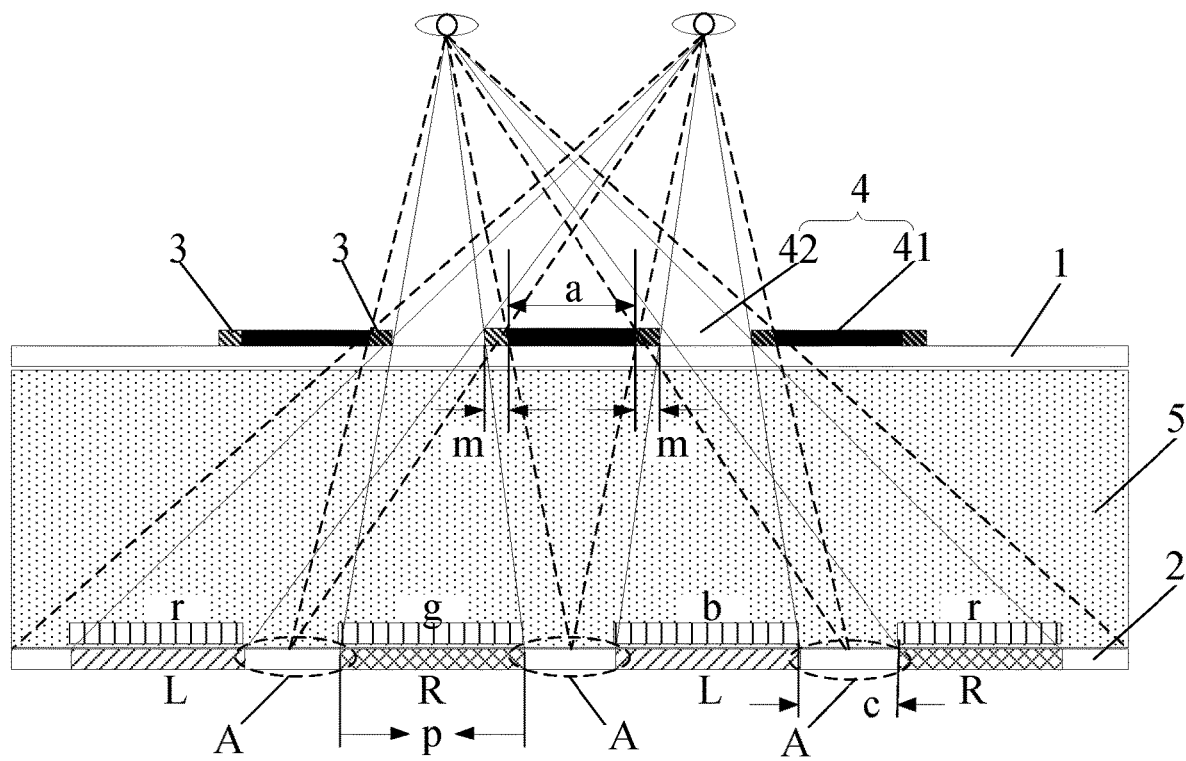
FIG. 2A is a schematic diagram of an optical path of a 3D display device according to an embodiment of the present disclosure.
Figure 2B:
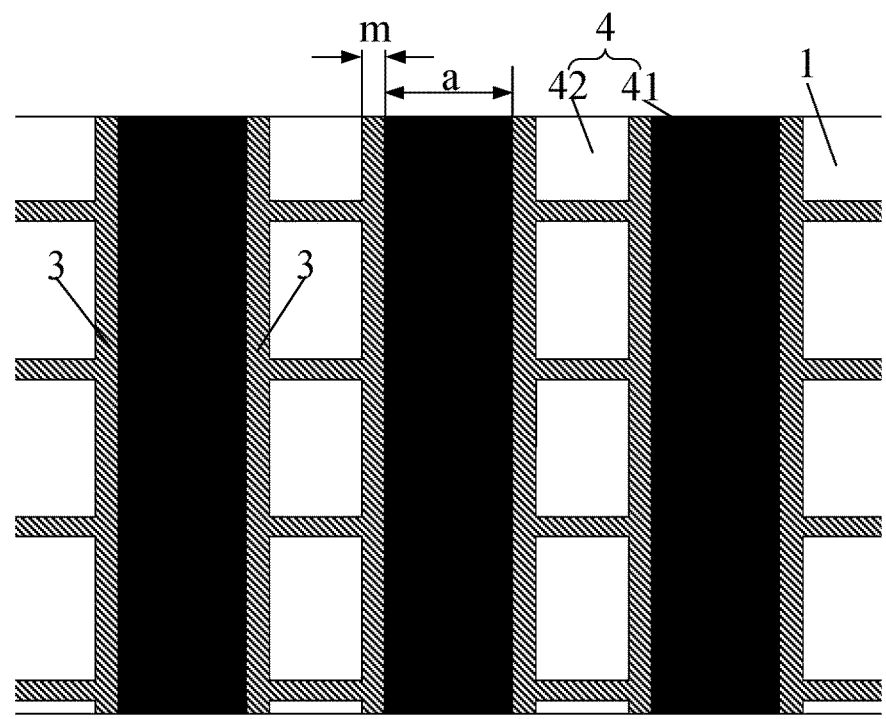
FIG. 2B is a top view of the first substrate in the embodiment shown in FIG. 2A.

As shown in FIG. 2A and FIG. 2B, the present disclosure provides a 3D display device. The 3D display device includes: a first substrate 1; a second substrate 2 disposed opposite to the first substrate 1; a black matrix 3; and a grating 4. The black matrix 3 and the grating 4 are disposed on a side of the first substrate 1 facing away from the second substrate 2; the black matrix 3 and the grating 4 are disposed in a same layer; and a side of the first substrate 1 where the black matrix 3 and the grating 4 are located is a light exit side of the 3D display device.

In this embodiment, the 3D display device is a liquid crystal display device, that is, a liquid crystal layer (shown by reference sign 5 in FIG. 2A) may be disposed between the first substrate 1 and the second substrate 2.

The second substrate 2 may be an array substrate, that is, the second substrate 2 may include a plurality of sub-pixels. Optionally, the second substrate 2 can also be provided with red, green and blue color filters (as shown by r, g, and b in FIG. 2A), and then the second substrate 2 is a COA (color filter on array) substrate. As shown in FIG. 2A and FIG. 2B, the line width of the black matrix 3 is m, and the projection of the black matrix 3 on the second substrate 2 is located between the directly adjacent sub-pixels for shielding the metal wiring of the thin film transistor on the second substrate 2. It should be noted that the "projection" referred to herein is a projection (i.e., oblique projection) of light received by the human eye on the second substrate 2. That is, along the sight line of the user, the projection of the black matrix on the second substrate is located between the directly adjacent sub-pixels. In the embodiment of the present disclosure, as shown in FIG. 2A, two directly adjacent sub-pixels may be a left-eye pixel L and a right-eye pixel R, respectively.

Optionally, in some embodiments, the second substrate is an array substrate, a color filter is disposed on the second substrate, and a side of the first substrate facing the second substrate is not provided with a black matrix.

Those skilled in the art can understand that the second substrate 2 in the embodiment of the present disclosure may also be an OLED display substrate, and thus the 3D display device of the embodiment of the present disclosure may also be an OLED display device.

It should be noted that the black matrix is usually disposed on a substrate opposite to a COA substrate, and the black matrix is usually disposed on a side of the substrate facing the COA substrate. In the present disclosure, since the black matrix 3 is disposed on the side of the first substrate 1 facing away from the second substrate 2, the black matrix is no longer disposed on the side of the first substrate 1 adjacent to the second substrate 2.

If the first substrate is a COA substrate, and the black matrix is baked during the preparation of the black matrix, there will be a problem that water vapor release in the black matrix is insufficient. In the embodiment of the present disclosure, the black matrix and the grating are disposed on a side of the first substrate facing away from the second substrate, and the side of the first substrate on which the black matrix and the grating are located is the light exit side of the 3D display device. Since the black matrix and the grating are not disposed between the two substrates, the liquid crystal molecules inside the 3D display device are not affected, so there is no need for an additional baking process, thereby improving both the production capacity and the display effect of the 3D display device.

Optionally, the black matrix 3 has a line width m of 5-10 μm. In this way, the aperture ratio can be achieved and the effect of preventing crosstalk of adjacent sub-pixels can be ensured.

Further, in order to realize the 3D display effect, as shown in FIG. 2A and FIG. 2B, the 3D display device may further include a grating 4 located on a side of the first substrate 1 facing away from the second substrate 2. The grating 4 includes a plurality of shielding portions 41 disposed in parallel with each other, the two side edges of each shielding portion 41 are in contact with the black matrix 3, respectively. A grating opening 42 is formed between two adjacent shielding portions 41.

Since the left eye and the right eye of human are horizontally located at two different positions, the grating is placed perpendicular to the two eyes (i.e., placed in parallel with the 3D display device), the left and right eyes thus have different viewing angles to the grating. The images presented by the 3D display device for the two eyes are different, and there is a parallax between the left eye image and the right eye image. Due to the existence of the parallax, a stereoscopic sense can be generated by the human brain, thereby realizing a 3D display effect.

Figure 1:
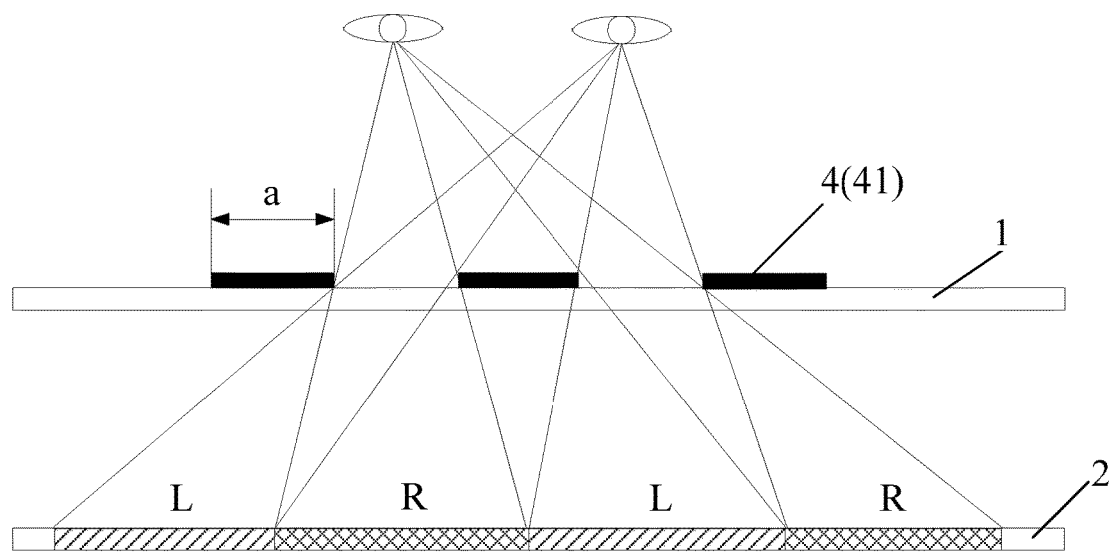
FIG. 1 is a schematic diagram of an optical path of a 3D display device under ideal conditions.

In an ideal state, the optical path of the 3D display device provided with the grating 4 is shown in FIG. 1. The sub-pixel regions of the second substrate 2 (i.e., the left-eye pixel region L and the right-eye pixel region R in FIG. 1) are all effective light-emitting regions, that is, there is no non-light-emitting region between adjacent sub-pixels. However, in practice, since the display element such as a thin film transistor is provided on the second substrate 2, it is inevitable to occupy a portion of the sub-pixel region. The region occupied by the thin film transistor in the sub-pixel is a non-light-emitting region. The left-eye pixel region L and the right-eye pixel region R are effective light-emitting regions, and form a sub-pixel together with the non-light-emitting region. As shown in FIG. 2A, the non-light-emitting region A needs to be shielded by the black matrix 3. Therefore, the projection of the black matrix 3 on the second substrate 2 covers the non-light-emitting region A.

In the embodiment of the present disclosure, as shown in FIG. 2a and FIG. 2B, the grating 4 includes a plurality of shielding portions 41 disposed in parallel with each other, and two side edges of each shielding portion 41 are respectively in contact with the black matrix 3.

It should be noted that the dotted line in FIG. 2A is the optical path when the black matrix 3 is not disposed outside the 3D display device (i.e., the optical path of FIG. 1), and the solid line in FIG. 2A is the light path when the black matrix 3 is connected to the corresponding shielding portions 41 of the grating 4. As can be seen from FIG. 2A, the projection of the black matrix 3 on the second substrate 2 can effectively cover the non-light-emitting regions A.

With the above arrangement, the problem that the poor display effect of the 3D display device caused by insufficient water vapor release of the black matrix 3 can be solved, and an additional baking process is not required, thereby taking into consideration both the production capacity and the display effect. In addition, the black matrix and the grating are skillfully combined, and 3D stereoscopic display can be realized on the basis of taking into account both the production capacity and display effect.

Optionally, in some embodiments, the second substrate includes a plurality of sub-pixels, and a crosstalk region between adjacent sub-pixels.

Optionally, in some embodiments, the black matrix, the shielding portion, the sub-pixel, and the crosstalk region satisfy the following relationship:

$$m = c \times k/2;$$

$$a + 2m = (p+c) \times k;$$

m is a line width of the black matrix, c is a line width of the crosstalk region, k is a shrinkage ratio, a is a line width of the shielding portion, and p is a line width of the sub-pixel. The shrinkage rate k is related to the distance from the user to the display device and the thickness of the display device, and can be set according to actual conditions.

Optionally, in some embodiments, the line width of the black matrix is about 4.996 µm, the line width of the crosstalk region is about 5 µm, the shrinkage ratio is about 0.9993, the line width of the shielding portion is about 49.964 µm, and the line width of the sub-pixel is about 50 µm.

Optionally, in some embodiments, a material of the grating 4 is same to a material of the black matrix 3.

Optionally, in some embodiments, the grating 4 and the black matrix 3 are formed integrally. When the grating 4 is integrally formed with the black matrix 3, the line width of the grating 4 is changed from the original a to a+2m. In this way, the grating 4 can be used for 3D display, and the black matrix 3 can be used to shield the wiring of the thin film transistor on the first substrate 1.

As shown in FIG. 2A and FIG. 2B, the line width a of the shielding portion 41 of the grating 4 may be 40-100 µm. It should be noted that the line width a of the shielding portion 41 can be set according to the type of the 3D display device. For example, if the 3D display device is a portable 3D display device such as a mobile phone or a pad, since the human eye is closer to the 3D display device (usually about 30 cm), the line width a of the shielding portion 41 can be a small value within the above range. If the 3D display device is a large 3D display device such as a television or a display, since the human eye is far away from the 3D display device (usually 1.5 m-2 m), the line width a of the shielding portion 41 can be a large value within the above range.

There are various arrangement modes in which the black matrix 3 is disposed on the side of the first substrate 1 facing away from the second substrate 2. Hereinafter, various arrangement modes of the black matrix 3 will be described in detail.

Mode 1: as shown in FIG. 2A, the black matrix 3 and the grating 4 are formed on a surface of the first substrate 1 facing away from the second substrate 2. The black matrix 3 and the grating 4 can be arranged in mode 1, so that the black matrix 3 and the grating 4 are directly formed on the first substrate 1, and the preparation process is simple.

Figure 2C:
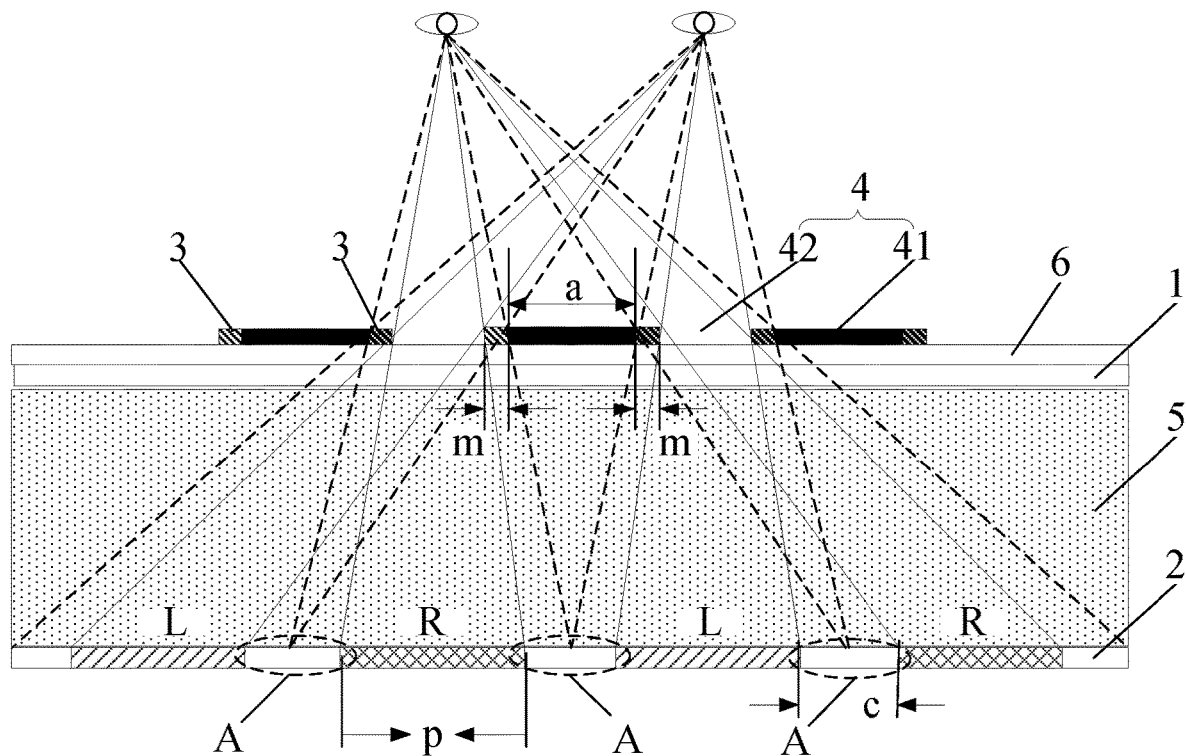
FIG. 2C is a schematic diagram of an optical path of a 3D display device according to another embodiment of the present disclosure.

Mode 2: as shown in FIG. 2C, the 3D display device further includes a third substrate 6 attached to the surface of the first substrate 1 facing away from the second substrate 2; the black matrix 3 and the grating 4 are formed on a surface of the third substrate 6 facing away from the second substrate 2. That is, the black matrix 3 and the grating 4 are not directly formed on the first substrate 1, but are directly formed on the third substrate 6. The third substrate 6 provided with the black matrix 3 is then attached to the first substrate 1, so that the black matrix 3 is located on the light exit side of the 3D display device.

Mode 3: as shown in FIG. 2D, the 3D display device further includes a film substrate 7 attached to the surface of the first substrate 1 facing away from the second substrate 2; the black matrix 3 and the grating 4 are formed on a surface of the film substrate 7 facing away from the second substrate 2. That is, the black matrix 3 and the grating 4 are not directly formed on the first substrate 1, but are directly formed on the film substrate 7. The film substrate 7 provided with the black matrix 3 is then attached to the first substrate 1, so that the black matrix 3 is located on the light exit side of the 3D display device.

It should be noted that, if the 3D display device further includes the grating 4 and the material of the grating 4 is the same as the material of the black matrix 3, in the above three modes, the grating 4 and the black matrix 3 may be formed simultaneously.

The present disclosure also provides a method of manufacturing the 3D display device as described above. The method will be described in detail below with reference to FIGS. 2A-2D and FIG. 3. The method includes the following steps.

Step S1, providing a first substrate 1 and a second substrate 2 opposite to the first substrate 1.

Specifically, the second substrate 2 may be an array substrate. Optionally, the second substrate 2 can also be provided with red, green and blue color filters, and then the second substrate 2 is a COA substrate. Correspondingly, the first substrate 1 may be a counter substrate, and a side of the first substrate 1 adjacent to the second substrate 2 is not provided with a black matrix.

Step S2, forming a black matrix 3 and a grating 4 on a side of the first substrate 1 facing away from the second substrate 2.

The black matrix 3 and the grating 4 are disposed in a same layer; and a side of the first substrate 1 where the black matrix 3 and the grating 4 are located is a light exit side of the 3D display device.

Optionally, in some embodiments, the second substrate includes a plurality of sub-pixels, and a crosstalk region between adjacent sub-pixels.

Optionally, in some embodiments, the black matrix, the shielding portion, the sub-pixel, and the crosstalk region satisfy the following relationship:

$$m = c \times k/2;$$

$$a + 2m = (p+c) \times k;$$

m is a line width of the black matrix, c is a line width of the crosstalk region, k is a shrinkage ratio, a is a line width of the shielding portion, and p is a line width of the sub-pixel. The shrinkage rate k is related to the distance from the user to the display device and the thickness of the display device, and can be set according to actual conditions.

Optionally, the black matrix 3 has a line width m of 5-10 μm.

In particular, the step of forming a black matrix 3 and a grating 4 on a side of the first substrate 1 facing away from the second substrate 2 can be realized by any one of the following solutions.

Solution 1: as shown in FIG. 2A, the black matrix and the grating are formed on a surface of the first substrate facing away from the second substrate by a patterning process. In this way, the black matrix 3 and the grating 4 are directly formed on the first substrate 1, and the preparation process is simple.

Solution 2: as shown in FIG. 2C, this solution specifically includes the following steps: forming the black matrix 3 and the grating 4 on a surface of a third substrate 6 by a patterning process; and attaching the third substrate 6 to the first substrate 1. The black matrix 3 and the grating 4 are located on a surface of the third substrate 6 facing away from the second substrate 2.

By applying solution 2, the black matrix 3 and the grating 4 are not directly formed on the first substrate 1, but are directly formed on the third substrate 6. The third substrate 6 provided with the black matrix 3 is then attached to the first substrate 1, so that the black matrix 3 is located on the light exit side of the 3D display device.

Solution 3: as shown in FIG. 2D, this solution specifically includes the following steps: forming the black matrix 3 and the grating 4 on a surface of a film substrate 7 by a patterning process; and attaching the film substrate 7 to the first substrate 1. The black matrix 3 and the grating 4 are located on a surface of the film substrate 7 facing away from the second substrate 2.

By applying solution 3, the black matrix 3 and the grating 4 are not directly formed on the first substrate 1, but are directly formed on the film substrate 7. The film substrate 7 provided with the black matrix 3 is then attached to the first substrate 1, so that the black matrix 3 is located on the light exit side of the 3D display device.

It should be noted that, in the step S2 (which can be realized by any one of the above three solutions), the grating 4 may be formed in synchronization with the black matrix 3. In some embodiments, as shown in FIG. 2A and FIG. 2B, the grating 4 includes a plurality of shielding portions 41 disposed in parallel with each other, and two side edges of each shielding portion 41 are in contact with the black matrix 3, respectively.

Optionally, the line width a of the shielding portion 41 of the grating 4 may be 40-100 μm.

The manufacturing method of the 3D display device is simple in process and easy to implement. Especially if the 3D display device includes the grating 4, the grating 4 and the black matrix 3 can be formed simultaneously, which can further simplify the preparation process.

In the embodiment of the present disclosure, the black matrix and the grating are disposed on a side of the first substrate facing away from the second substrate, and the side of the first substrate on which the black matrix and the grating are located is the light exit side of the 3D display device. Since the black matrix and the grating are not disposed between the two substrates, the liquid crystal molecules inside the 3D display device are not affected, so there is no need for an additional baking process, thereby improving both the production capacity and the display effect of the 3D display device.

It can be understood that the above embodiments are merely exemplary embodiments used for illustrating the principle of the present disclosure, and the present disclosure is not limited thereto. For a person of ordinary skill in the art, variations and improvements may be made without departing from the spirit and essence of the present disclosure. These variations and improvements are also considered to be within the scope of the present disclosure.

What is claimed is:

1. A 3D display device, comprising:
a first substrate;
a second substrate disposed opposite to the first substrate;
a black matrix; and
a grating;
wherein the black matrix and the grating are disposed on a side of the first substrate facing away from the second substrate; the black matrix and the grating are disposed in a same layer; and a side of the first substrate where the black matrix and the grating are located is a light exit side of the 3D display device,
wherein the grating comprises a plurality of shielding portions disposed in parallel with each other, and two side edges of each shielding portion are respectively in contact with the black matrix,
wherein the second substrate comprises a plurality of sub-pixels, and a crosstalk region between adjacent sub-pixels, and
wherein a line width of the black matrix is 4.996 μm, a line width of the crosstalk region is 5 μm, a shrinkage ratio is 0.9993, a line width of a shielding portion is 49.964 μm, and a line width of the sub-pixel is 50 μm.

2. The 3D display device according to claim 1, wherein the second substrate is an array substrate, a color filter is disposed on the second substrate, and a side of the first substrate facing the second substrate is not provided with a black matrix.

3. The 3D display device according to claim 2, wherein the black matrix and the grating are formed on a surface of the first substrate facing away from the second substrate.

4. The 3D display device according to claim 2, further comprising: a third substrate attached to a surface of the first substrate facing away from the second substrate; wherein the black matrix and the grating are formed on a surface of the third substrate facing away from the second substrate.

5. The 3D display device according to claim 2, further comprising: a film substrate attached to a surface of the first substrate facing away from the second substrate; wherein the black matrix and the grating are formed on a surface of the film substrate facing away from the second substrate.

6. The 3D display device according to claim 1, wherein a material of the grating is same to a material of the black matrix.

7. The 3D display device according to claim 6, wherein the grating and the black matrix are formed integrally.

8. The 3D display device according to claim 1, wherein the black matrix and the grating are formed on a surface of the first substrate facing away from the second substrate.

9. The 3D display device according to claim 1, further comprising: a third substrate attached to a surface of the first substrate facing away from the second substrate; wherein the black matrix and the grating are formed on a surface of the third substrate facing away from the second substrate.

10. The 3D display device according to claim 1, further comprising: a film substrate attached to a surface of the first substrate facing away from the second substrate; wherein the black matrix and the grating are formed on a surface of the film substrate facing away from the second substrate.

11. A method for manufacturing a 3D display device, comprising:
  providing a first substrate and a second substrate opposite to the first substrate; and
  forming a black matrix and a grating on a side of the first substrate facing away from the second substrate;
  wherein the black matrix and the grating are disposed in a same layer; and a side of the first substrate where the black matrix and the grating are located is a light exit side of the 3D display device,
  wherein the grating comprises a plurality of shielding portions disposed in parallel with each other, and two side edges of each shielding portion are respectively in contact with the black matrix,
  wherein the second substrate comprises a plurality of sub-pixels, and a crosstalk region between adjacent sub-pixels, and
  wherein a line width of the black matrix is 4.996 μm, a line width of the crosstalk region is 5 μm, a shrinkage ratio is 0.9993, a line width of a shielding portion is 49.964 μm, and a line width of the sub-pixel is 50 μm.

12. The method according to claim 11, wherein forming a black matrix and a grating on a side of the first substrate facing away from the second substrate comprises:
  forming the black matrix and the grating on a surface of the first substrate facing away from the second substrate by a patterning process.

13. The method according to claim 11, wherein forming a black matrix and a grating on a side of the first substrate facing away from the second substrate comprises:
  forming the black matrix and the grating on a surface of a third substrate by a patterning process; and
  attaching the third substrate to the first substrate;
  wherein the black matrix and the grating are located on a surface of the third substrate facing away from the second substrate.

14. The method according to claim 11, wherein forming a black matrix and a grating on a side of the first substrate facing away from the second substrate comprises:
  forming the black matrix and the grating on a surface of a film substrate by a patterning process; and
  attaching the film substrate to the first substrate;
  wherein the black matrix and the grating are located on a surface of the film substrate facing away from the second substrate.

* * * * *